United States Patent
Ahuja et al.

(10) Patent No.: US 11,999,413 B2
(45) Date of Patent: Jun. 4, 2024

(54) METHOD FOR MANUFACTURING A MOTOR VEHICLE STRUCTURAL COMPONENT FROM AN EXTRUDED MULTICHAMBER HOLLOW PROFILE

(71) Applicant: BENTELER AUTOMOBILTECHNIK GMBH, Paderborn (DE)

(72) Inventors: Gaurav Ahuja, Lasalle (CA); Vijay Michael, Grand Rapids, MI (US); Per Ivar Stemnes, Raufoss (NO); Jochem Grewe, Salzkotten (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 17/539,239

(22) Filed: Dec. 1, 2021

(65) Prior Publication Data
US 2023/0166799 A1 Jun. 1, 2023

(51) Int. Cl.
*B62D 29/00* (2006.01)
*B21C 23/12* (2006.01)
*B21C 23/14* (2006.01)

(52) U.S. Cl.
CPC ............ *B62D 29/008* (2013.01); *B21C 23/12* (2013.01); *B21C 23/142* (2013.01)

(58) Field of Classification Search
CPC ...... B62D 29/008; B21C 23/12; B21C 23/142
See application file for complete search history.

(56) References Cited

U.S. PATENT DOCUMENTS

2018/0236851 A1   8/2018   Shimoaka et al.
2018/0297098 A1*  10/2018  Kerr ..................... B21D 22/025
2019/0091745 A1*  3/2019   Gotthelf ................. B21D 37/10

FOREIGN PATENT DOCUMENTS

DE   10 2014 004 183 A1   9/2014
EP              733539 A1 *  9/1996   ........... B21C 23/142
(Continued)

OTHER PUBLICATIONS

Machine Translation of EP-733539-A1 (Year: 1996).*
Machine Translation of JP-09122747-A (Year: 1997).*

*Primary Examiner* — Jason L Vaughan
(74) *Attorney, Agent, or Firm* — Norman B. Thot

(57) ABSTRACT

The invention concerns a method for manufacturing a motor vehicle structural component (1) from an extruded multi-chamber hollow profile, with the following steps:
  a) provision of an extruded profile (2) with at least two precursor hollow chambers (8, 9) which are separated from one another by an inner wall (7), wherein at least one outer wall (3, 4) of at least one precursor hollow chamber (8, 9), in cross-section perpendicularly to the longitudinal extent of the extruded profile (2), has a region (16) with non-linear course,
  b) forming of the extruded profile (2) in at least one of its end regions into the motor vehicle structural component (1), wherein at least the region (16) with non-linear course of the at least one outer wall (3, 4) of the at least one precursor hollow chamber (8, 9), with non-linear course in cross-section, is at least partially straightened, with a change in cross-section of the respective precursor hollow chamber (8, 9) into the cross-section of the corresponding hollow chamber (14, 15) of the motor vehicle structural component (1).

12 Claims, 5 Drawing Sheets

(56) References Cited

FOREIGN PATENT DOCUMENTS

Figure 1:
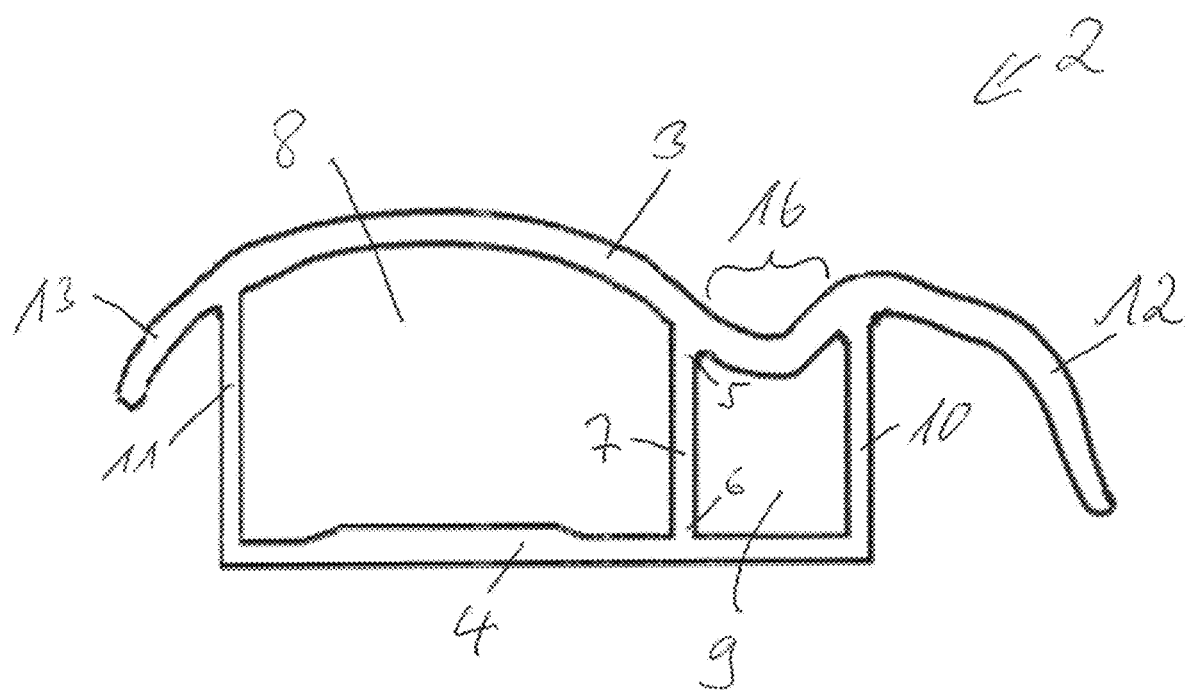

| | | | |
|---|---|---|---|
| JP | 09122747 A | * | 5/1997 |
| JP | H09-122747 A | | 5/1997 |
| WO | WO 2016/198396 A1 | | 12/2016 |

* cited by examiner

METHOD FOR MANUFACTURING A MOTOR VEHICLE STRUCTURAL COMPONENT FROM AN EXTRUDED MULTICHAMBER HOLLOW PROFILE

The invention concerns a method for manufacturing a motor vehicle structural component from an extruded multichamber hollow profile.

Such manufacturing methods are known for example from WO 2016 198396 A1. In this method, an extruded hollow chamber profile or multichamber hollow profile, on the outer wall of which a web is arranged, is clamped in a two-piece tool. The web of the extruded hollow chamber profile is clamped between the two tool halves, and its hollow chamber is laid in a cavity of the tool. Inside this hollow chamber, the hollow chamber profile is now expanded into a finished component in that the cavity is widened by means of wedge-shaped tools in the form of internal mandrels, wherein its width is increased and its height reduced. Also, methods are disclosed there for manufacturing components of extruded two-chamber hollow profiles in which the two hollow chambers are separated by means of a web. In this method for manufacturing corresponding components however, forming of the extruded multichamber profile is disadvantageous in that the component size is restricted by the available extrusion tools because of the protrusion of the web necessary for clamping the extruded hollow chamber profile in the forming tool. The cross-section of the hollow chamber or chambers plus the configuration of the web must not in fact exceed the dimensions of the extrusion tool. If components are to be produced which exceed the dimensions of the extrusion tool, a larger machine for manufacturing extruded hollow chamber profiles or multichamber profiles must be procured, which is associated with a huge additional logistical complexity and is also disadvantageous from economic aspects.

It is therefore an object of the invention to provide a method for manufacturing a motor vehicle structural component from an extruded multichamber profile which can be produced on existing equipment for manufacturing extruded profiles, wherein the dimensions of the definitive motor vehicle structural component are greater than the dimensions of extruded profiles which can be produced with this equipment.

This object is achieved with a method with all features of claim 1. Advantageous embodiments of the invention are given in the sub-claims.

The method according to the invention for manufacturing a motor vehicle structural component from an extruded multichamber hollow profile has the following method steps:
  a) provision of an extruded profile with at least two precursor hollow chambers which are separated from one another by an inner wall, wherein at least one outer wall of at least one precursor hollow chamber, in transverse extent perpendicularly to the longitudinal extent of the extruded profile, has a region with non-linear course,
  b) forming of the extruded profile in at least one of its end regions into the motor vehicle structural component, wherein at least the region with non-linear course, in transverse extent, of the at least one outer wall of the at least one precursor hollow chamber is at least partially straightened, with a change in cross-section of the respective precursor hollow chamber into the cross-section of the corresponding hollow chamber of the motor vehicle structural component.

Thus in a first method step, an extruded profile is produced with at least two precursor hollow chambers which are separated from one another by an inner wall, wherein at least one outer wall of at least one precursor hollow chamber, in the transverse extent perpendicularly to the longitudinal extent of the extruded profile, has a region with non-linear course, and in a second step the extruded profile is formed in at least one of its end regions into a motor vehicle structural component, wherein at least the region with non-linear course, in the transverse extent, of the at least one outer wall of the at least one precursor hollow chamber is at least partially straightened, with a change in cross-section of the respective precursor hollow chamber into the cross-section of the corresponding hollow chamber of the motor vehicle component, whereby it is possible to produce motor vehicle structural components with dimensions which are larger than the dimensions of the extruded precursor components. To this extent, with the method according to the invention, it is possible to produce motor vehicle structural components from extruded multichamber hollow profiles on extrusion machines which are not really designed for motor vehicle structural components of this size. The essential feature of the manufacturing method is that the extruded profile provided already has the above-mentioned non-straight web arranged on a precursor hollow chamber, which is straightened in the method according to the invention, and the outer walls of the at least one later-formed precursor hollow chamber of the extruded profile are formed such that the cross-section of the at least one formed hollow chamber of the motor vehicle structural component is larger than the corresponding precursor hollow chamber of the extruded profile.

With the embodiment of the manufacturing method according to the invention, it is now possible, using machines for the production of extruded hollow chamber profiles and multichamber profiles, to manufacture motor vehicle structural components or precursor components for these, having dimensions which cannot normally be produced on such machines since the dimensions of the motor vehicle structural component to be manufactured are really too large for such machines. Because these motor vehicle structural components, in a precursor product in the form of an extruded profile, can be manufactured on these machines at least as precursor components, it is not necessary to procure new machines for production of extruded hollow chamber profiles or multichamber hollow profiles, whereby the logistical complexity and also the economic cost of production of such motor vehicle structural components are significantly reduced. To manufacture such motor vehicle structural components, existing equipment for the production of extruded hollow chamber profiles or multichamber hollow profiles and forming machines for forming such extruded multichamber hollow profiles or extruded hollow profiles can be used. Such forming machines may be used for various motor vehicle structural components, since they can usually be equipped with different tools, in particular pressing tools, so that where necessary only these pressing tools need be procured and not separate forming machines.

In the context of the invention, a region of an outer wall with non-linear course means that the outer wall, viewed in cross-section, has a concave or convex curvature, for example semicircular, or is undulating. The curvature, measured in cross-section as a maximum deviation or distance from the theoretical straight line, here amounts to at least 10% of the length of this region of the outer wall and in any case at least 10 mm.

According to a first embodiment of the invention, the forming in step b) takes place in the cavity of a split pressing tool with at least two separate parts, wherein in one precursor hollow chamber of the extruded profile the cross-section remains substantially unchanged, and a forming tool or mandrel is inserted, the outer contour of which corresponds to an inner contour of a hollow chamber of the motor vehicle structural component, while in the precursor hollow chamber of the extruded profile of which the cross-section is changed, an expanding forming tool or transversely movable mandrel is inserted, which expands or is moved transversely during and/or after closing of the split pressing tool until the definitive form of the hollow chamber of the motor vehicle structural component is achieved.

With such forming of the extruded profile into the motor vehicle structural component, it is guaranteed that the hollow chambers have the desired dimensions, so that in this way, not only production but also calibration of the hollow chambers or motor vehicle structural component is possible.

According to an advantageous embodiment of the invention, during the forming in step b), the thickness of at least one outer wall of the hollow chamber with cross-section to be changed is reduced, and the thickness of at least one other outer wall of the hollow chamber with cross-section to be changed remains substantially unchanged.

Furthermore, in an advantageous embodiment of the invention, it is provided that at least on an outer wall of at least one precursor hollow chamber, a non-linear web is arranged which is at least partially straightened in step b).

Furthermore, it may be provided that the forming according to step b) takes place such that a circumscribing circle of the extruded profile has a smaller diameter than a describing circle of the motor vehicle structural component. In this way, it is further clarified that the dimensions of the motor vehicle structural component are significantly larger than the structures of the provided extruded profile, whereby it is possible that such motor vehicle structural components can be produced on machines for the production of extruded profiles which are actually not suitable for manufacture of such large motor vehicle structural components.

According to a further advantageous embodiment of the invention, it is provided that the at least one precursor hollow chamber is formed in multiple phases such that firstly a compression takes place of at least one outer wall in a compression direction, and during this the width or height of the precursor hollow chamber is reduced, and then an expansion takes place of this at least one outer wall in an expansion direction, wherein the expansion direction stands at an angle between 30° and 150° to the compression direction. This achieves that the at least one hollow chamber is compressed accordingly in a first forming step inside the pressing tool, while in a second step it is expanded into the definitive hollow chamber of the motor vehicle structural component, wherein at the same time it is calibrated, while calibration of the further hollow chambers may take place already in the first forming step inside the pressing tool with corresponding fixed and non-expanding inner mandrels.

It may furthermore be provided that the at least one precursor hollow chamber is formed in multiple phases such that firstly an expansion of at least one outer wall takes place in an expansion direction, wherein the expansion direction stands at an angle between 30° and 150° to the compression direction, and then a compression of this at least one outer wall takes place in a compression direction, and during this the width or height of the precursor hollow chamber is reduced.

According to a further concept of the invention, it is provided that the inner wall is not formed during the forming in step b). This achieves that the inner wall, which separates the precursor hollow chamber to be formed from a precursor hollow chamber not to be formed, remains unchanged during forming and hence retains its dimensions. This guarantees that the structure of this inner wall remains unchanged, and the inner structure created during extrusion and hence the stability is retained. Here however, the connecting points of the inner wall to the corresponding outer walls may undergo a slight forming, wherein however the inner wall itself is not formed.

Alternatively, it may also be provided that the inner wall is also formed during the forming in step b). It must be taken into account here that in production of the provided extruded profile, the inner wall is dimensioned accordingly in order to give the necessary stability of the motor vehicle structural component to be manufactured.

In a further embodiment of the invention, it is provided that at least one of the hollow chambers of the motor vehicle structural component has a smaller width than the corresponding precursor hollow chamber of the extruded profile. Alternatively, it may naturally also be provided that at least one of the hollow chambers of the motor vehicle structural component has a greater width than the corresponding precursor hollow chamber of the extruded profile. Both possibilities allow corresponding dimensioning of the motor vehicle structural component according to the inventive concept, which can be produced on the same equipment for producing an extruded profile and then formed in a corresponding forming machine, in particular with pressing tools and fixed and/or expanding inner mandrels, into the definitive motor vehicle structural component.

In the same way, it is also possible that at least one of the hollow chambers of the motor vehicle structural component has a smaller height than the corresponding precursor hollow chamber of the extruded profile, or a greater height than the corresponding precursor hollow chamber of the extruded profile.

According to a further concept of the invention, it is provided that the at least one precursor hollow chamber of the extruded profile in cross-section is formed round, oval or arcuate in at least a partial periphery, and is formed into a polygonal hollow chamber of the motor vehicle structural component. Such round, oval or arcuate peripheries or partial peripheries can easily be produced in the extrusion process, and the subsequent forming of the precursor hollow chambers changes the inner structure of their outer walls only minimally, so that potential weak points can be avoided.

It may furthermore be provided that the forming according to step b) takes place exclusively in one or both end regions of the longitudinal extent of the extruded profile. However, it is also possible that the forming in step b) takes place over the entire longitudinal extent of the extruded profile.

According to a further concept of the invention, it is provided that the forming according to step b) is carried out with a residual heat of the extruded profile. This embodiment of the invention allows a more effective forming of the extruded profile into the motor vehicle structural component. The residual heat of the provided extruded profile allows easier forming thereof in the forming tool or pressing tool, since a warmed extruded profile can be formed significantly more efficiently in energy terms than a cooled extruded profile. To this extent, the residual heat may be used so as to avoid both an energetically less favorable, cold forming of the extruded profile and a further heating of the extruded profile. In this way, the energy balance in manufacture of the motor vehicle structural component is optimized.

According to a further embodiment of the invention, it is provided that both compression and expansion are carried out inside the split pressing tool in the same pressing stroke. Alternatively, it is also possible to carry out compression and expansion sequentially successively, also in different tools.

Finally, protection is claimed for a motor vehicle structural component manufactured using a method as described above. It is advantageous here if the motor vehicle structural component is made from an aluminum alloy of group 6000 or 7000 to EN 573-3. Such aluminum alloys can be produced particularly well in the extrusion process and formed accordingly.

Further objectives, advantages, features and possible applications of the present invention arise from the following description of exemplary embodiments, given with reference to the drawings. All features described and/or depicted in the figures may, alone or in arbitrary sensible combination, form the object of the present invention, even independently of their summary in the claims or back reference.

Figure 2:
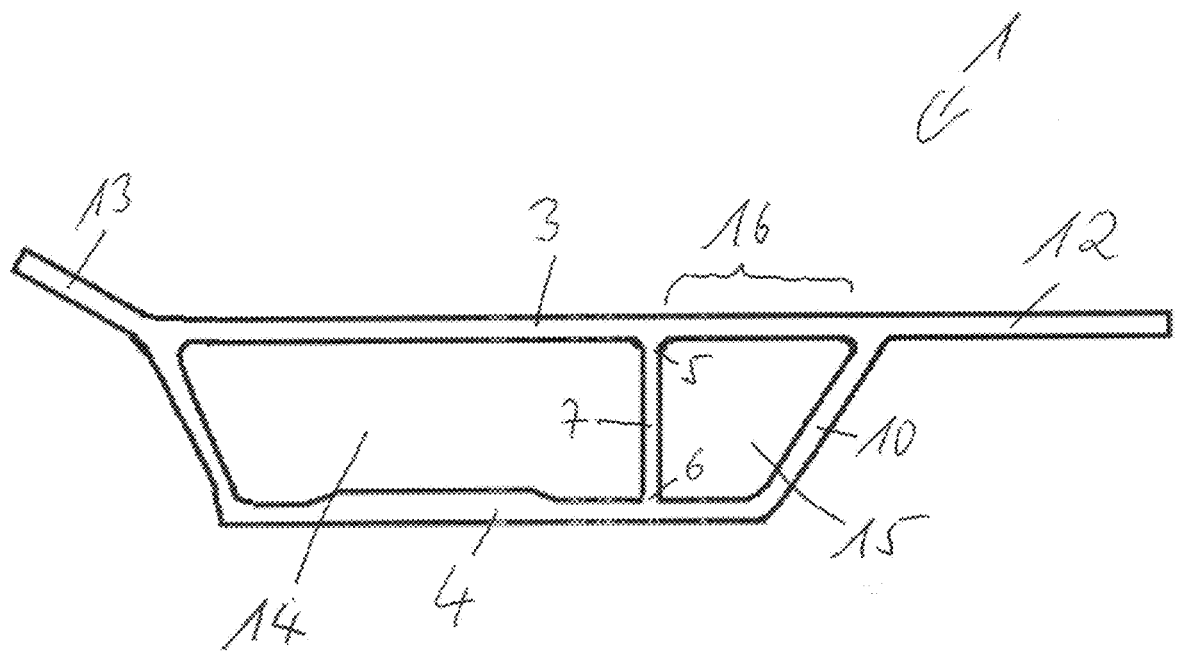
Figure 3:
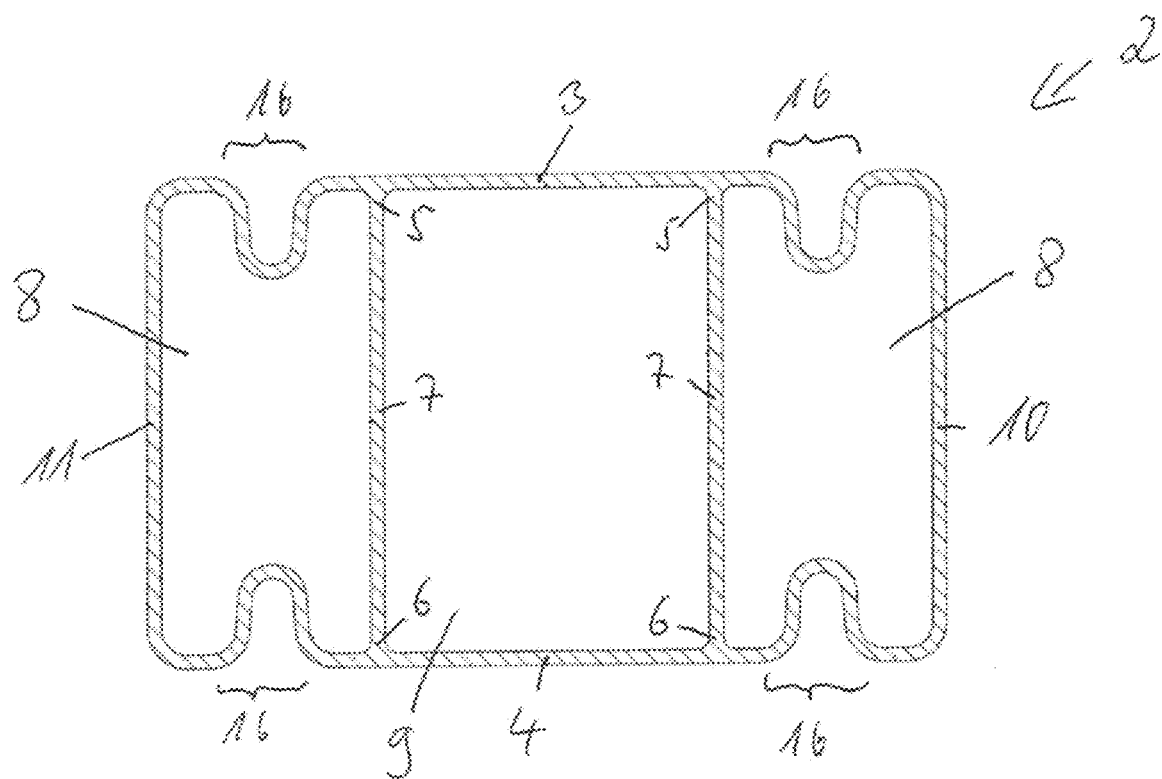
Figure 4:
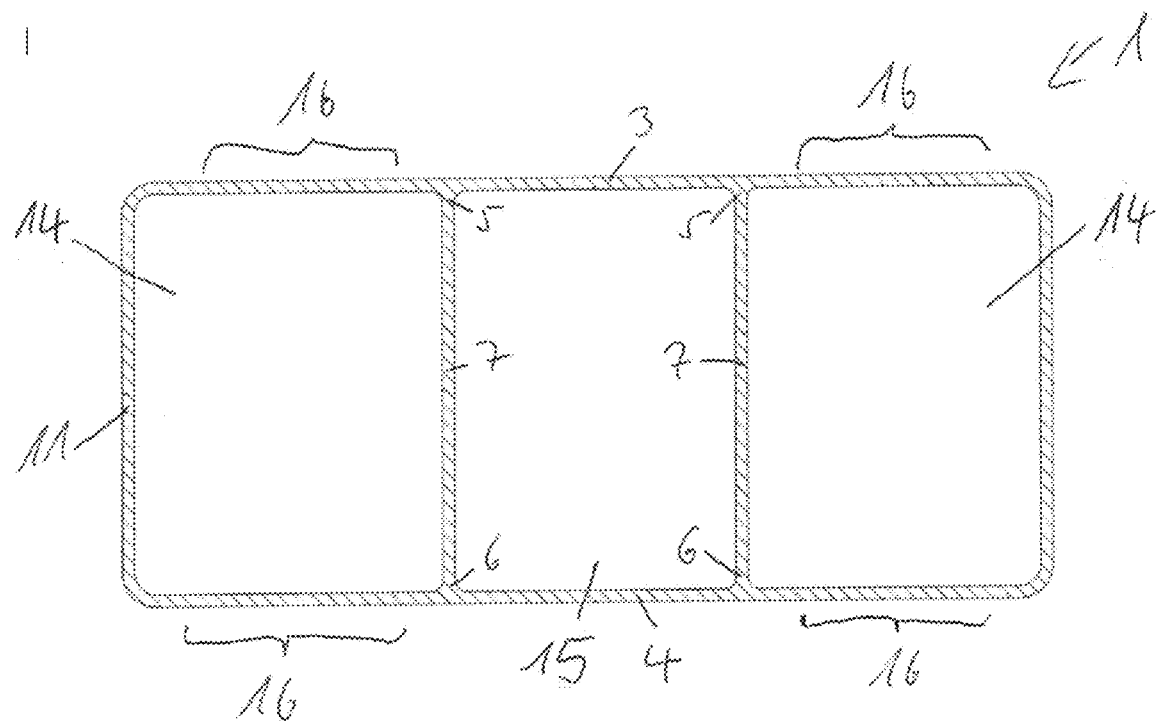
Figure 5:
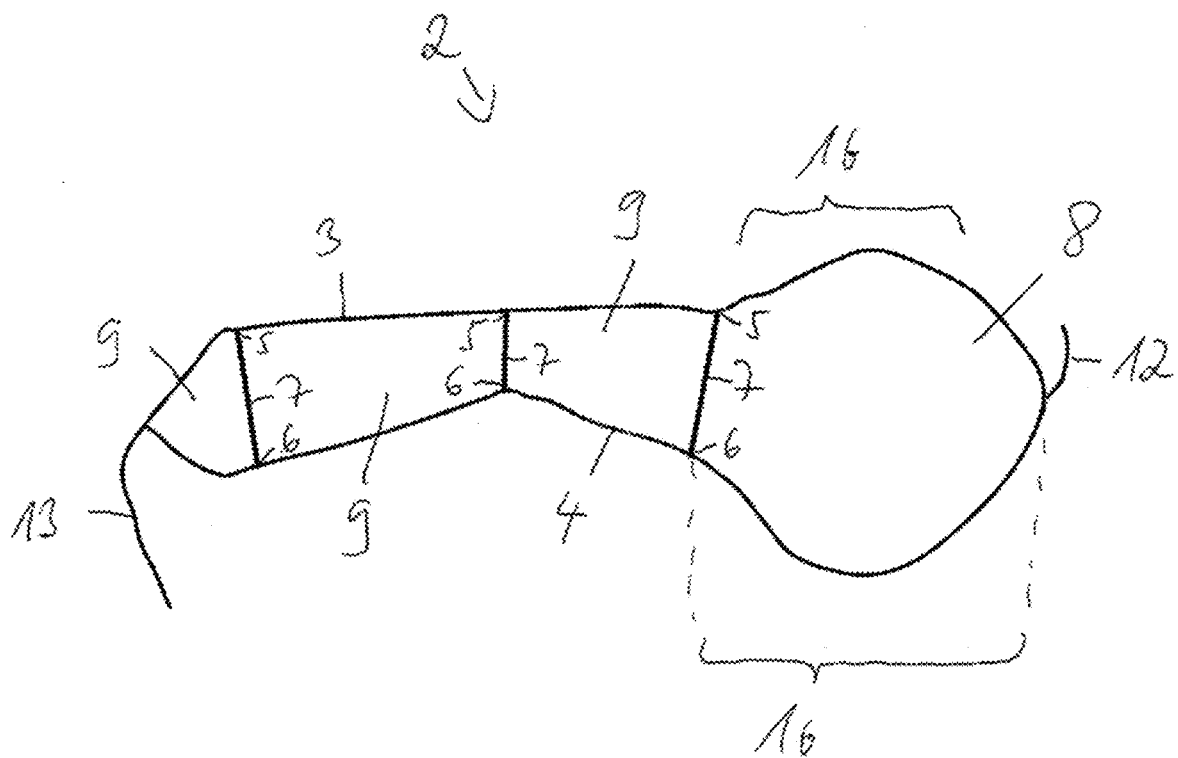
Figure 6:
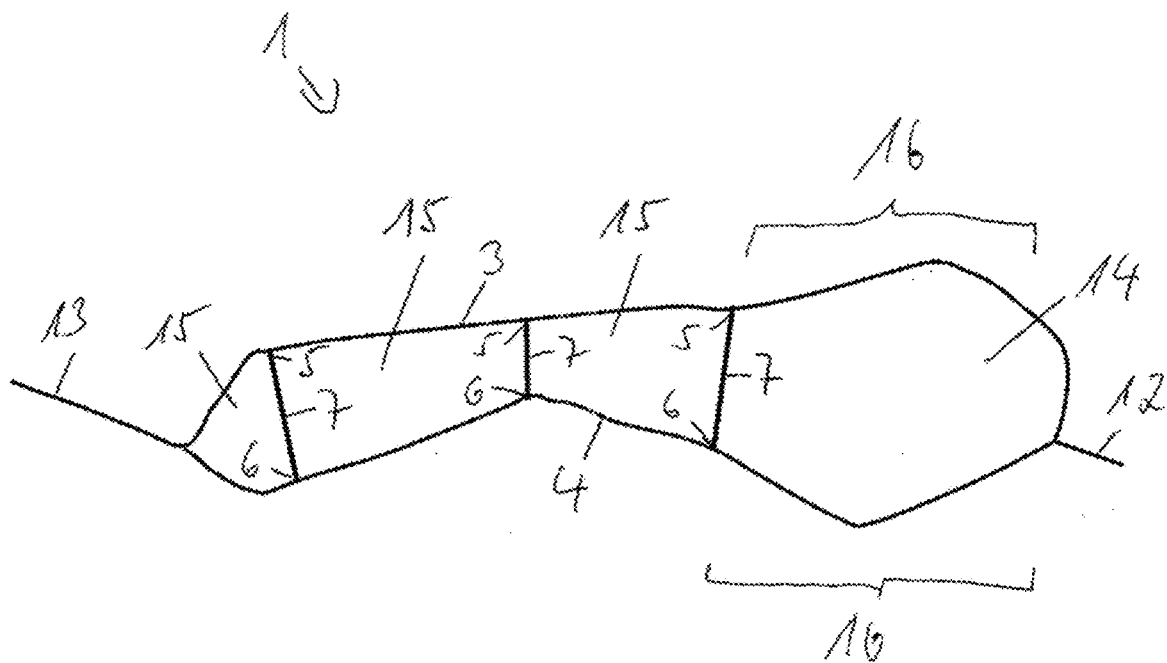
Figure 7:
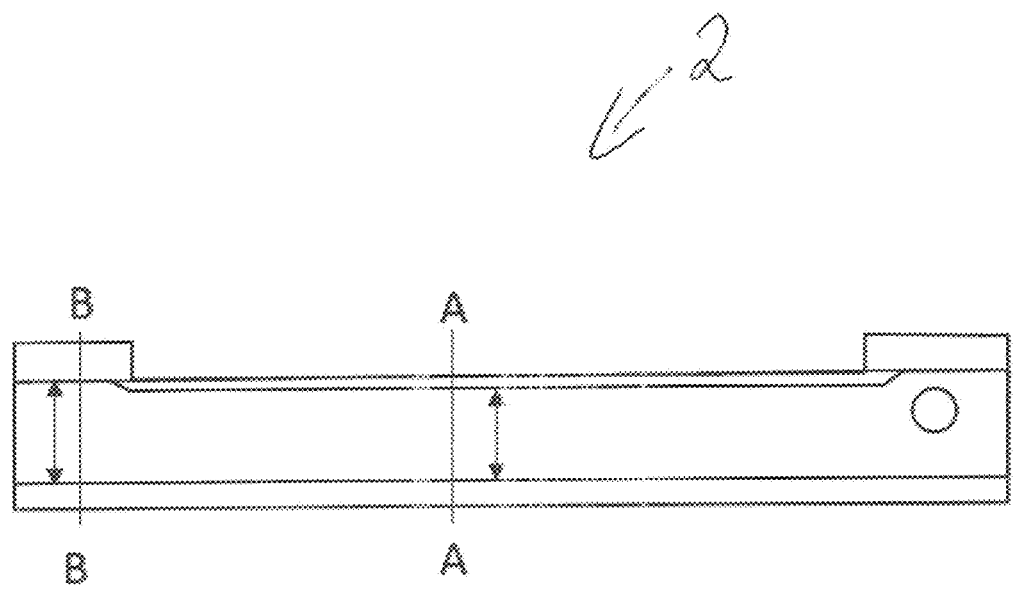
Figure 8:
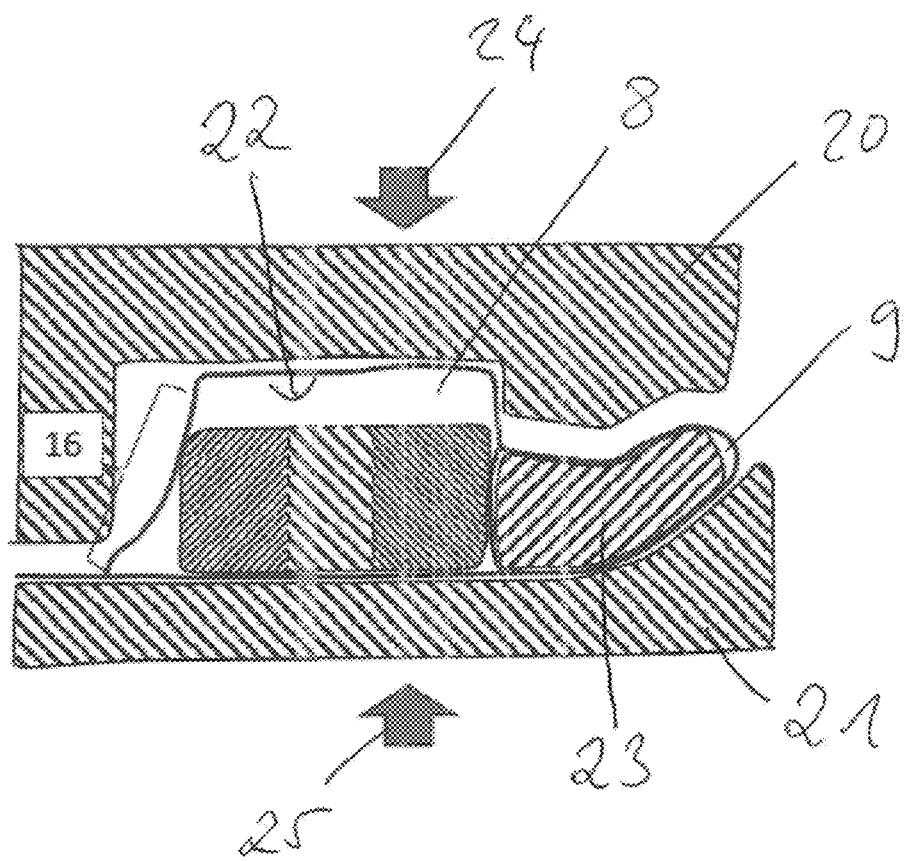
Figure 9:
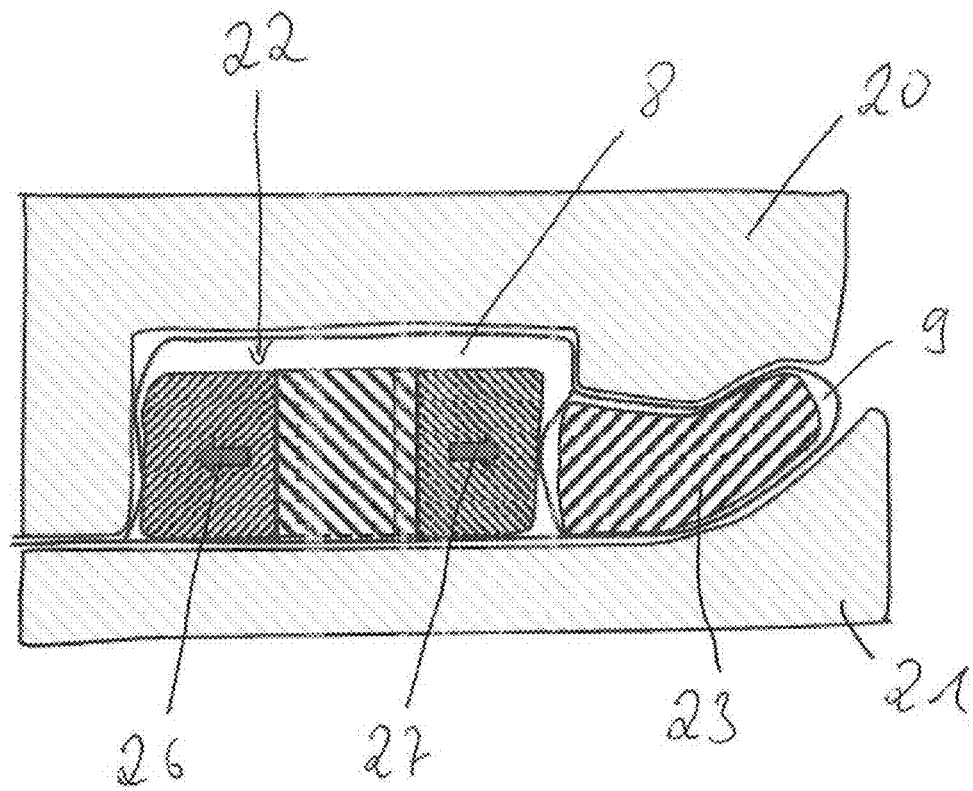
Figure 10:
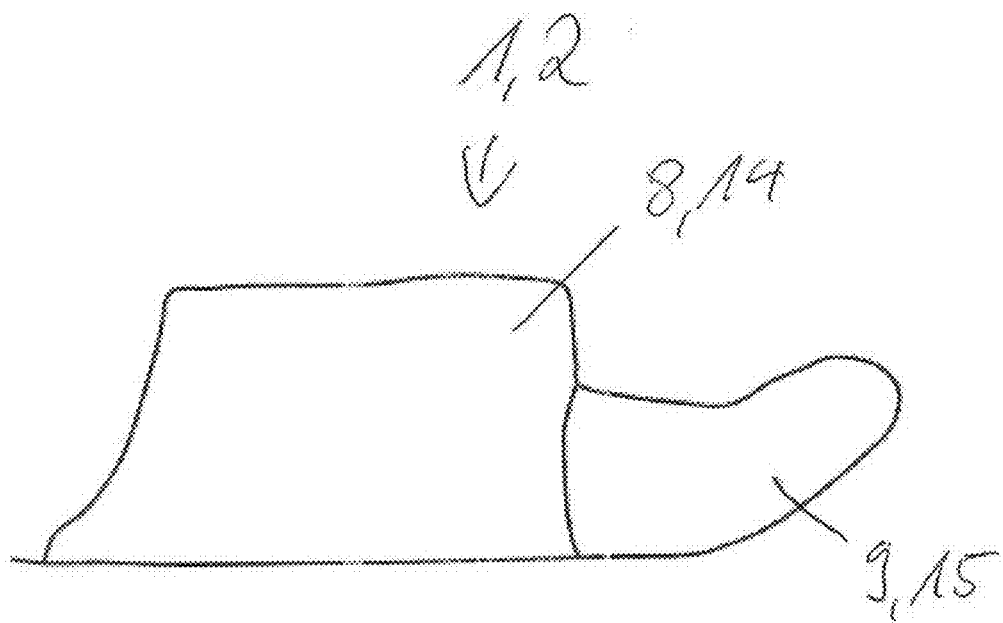

The drawings show:

FIG. 1: an exemplary embodiment of an extruded two-chamber hollow profile in cross-sectional illustration, before forming according to the invention, FIG. 2: an exemplary embodiment of a motor vehicle structural component according to the invention, after forming according to the invention of the extruded profile from FIG. 1, FIG. 3: an exemplary embodiment of an extruded three-chamber hollow profile in a cross-sectional illustration, before forming according to the invention into a crash box, FIG. 4: the exemplary embodiment of an extruded three-chamber hollow profile according to FIG. 3, after forming according to the invention into a crash box, FIG. 5: an exemplary embodiment of an extruded four-chamber profile in a cross-sectional illustration, before forming according to the invention into a bulkhead profile, FIG. 6: the exemplary embodiment of an extruded three-chamber hollow profile from FIG. 5, after forming according to the invention into a bulkhead profile, FIG. 7: an exemplary embodiment of an extruded two-chamber hollow profile in top view, FIG. 8: the two-chamber hollow profile from FIG. 7 with inserted forming tool, placed in a split pressing tool, in a cross-sectional illustration along section plane B-B of FIG. 7, before forming according to the invention into a bumper, FIG. 9: the two-chamber hollow profile from FIG. 7 with inserted forming tool, placed in a split pressing tool, in a cross-sectional illustration along section plane B-B of FIG. 7, after forming according to the invention into a bumper, and FIG. 10: the two-chamber hollow profile from FIG. 7 in a sectional illustration along the sectional plane A-A of FIG. 7.

FIG. 1 shows a cross-sectional illustration of an exemplary embodiment of an extruded profile 2 with two precursor hollow chambers 8 and 9. The two precursor hollow chambers 8 and 9 are separated from one another by an inner wall 7. The inner wall 7 is connected to the insides of outer walls 3 and 4 at connecting points 5 and 6. The outer wall 3 is formed curved, in contrast to outer wall 4 which is straight or flat in its transverse extent between outer walls 10 and 11, and hence configured so as to be linear. In its transverse extent between the outer walls 10 and 11, the outer wall 3 thus has regions 16 with a non-linear course. In the region of the connecting points of the outer walls 10 and 11 with the outer wall 3, webs 12 and 13 are arranged which are also configured so as to be not straight or to be curved towards the outer walls 10 and 11. This curved design of the webs 12 and 13 is due to the fact that such an extruded profile 2 can be produced on a machine for extruding hollow chamber profiles or multichamber hollow profiles, the maximum production capacity of which corresponds to the distances between the curved webs 12 and 13.

After providing the extruded profile 2 according to FIG. 1, this extruded profile 2 is laid in a split pressing tool (not shown here), wherein the precursor hollow chambers 8 and 9 of the extruded profile 2 are filled with inner mandrels (not shown in figures).

Depending on the motor vehicle structural component 1 which is to be produced, these mandrels and also the pressing tool may be designed to form the extruded profile 2 in its entire longitudinal extent. Alternatively, it is also possible that such forming takes place only in the end regions of the extruded profile 2, with corresponding inner mandrels and a two-part or multipart pressing tool. After insertion of the extruded profile 2 in the split pressing tool (not shown in the figures), the curved non-linear outer wall 3 is straightened over its entire transverse extent, in particular in the region 16 with non-linear course, so that it runs parallel to the opposite outer wall 4. During this straightening of the outer wall 3, the inner mandrels may be expanded for example with transversely expanding mandrels (not shown here) such that the outer walls 10 and 11 of the precursor hollow chambers 8 and 9 are formed accordingly. This forming need not take place simultaneously with straightening of the outer wall 3. Rather, this forming of the outer walls 10 and 11, which is accompanied by expansion of the precursor hollow chambers 8 and 9, may take place following the straightening of the outer wall 3.

Also during straightening of the outer wall 3 or after this, the webs 12 and 13 arranged on the outer walls 10 and 11 may be straightened. After such forming of the extruded profile 2 from FIG. 1, the finished motor vehicle structural component 1 from FIG. 2 is achieved. As evident from FIG. 2, the web 12 arranged on the outer wall 10 now extends in a continuation of the outer wall 3 of the motor vehicle structural component 1. The angle between the web 12 and the outer wall 3 is accordingly 180°. In contrast, the web 13 arranged on the outer wall 11 is arranged at an obtuse angle to the outer wall 3.

During forming of the extruded profile 2 in the split pressing tool, not only is the outer wall 3 straightened but also the outer walls 10 and 11 are stretched, while the inner wall 7 separating the precursor hollow chambers 8 and 9 remains unchanged during the entire forming process. The outer walls 10 and 11, which still stand perpendicularly to the outer wall 4 in the extruded profile 2, are angled by the expansion of the inner mandrels inside the precursor hollow chambers 8 and 9 of the extruded profile 2 such that they now run at an obtuse angle to the outer wall 4 of the motor vehicle structural component 1. The angle which the outer walls 10 and 11 form with the outer wall 3 is however acute.

As evident from FIGS. 1 and 2, the height of the motor vehicle structural component 1 is reduced in comparison with the height of the extruded profile 2 provided, while the width of the entire motor vehicle structural component 1 has increased in comparison with the extruded profile 2. It is also found that the width of the hollow chambers 14 and 15 of the motor vehicle structural component 1 has increased in comparison with the width of the precursor hollow chambers 8 and 9 of the extruded profile 2. The cross-sectional area of the hollow chambers 14 and 15 of the motor vehicle component 1 has thus changed in comparison with the cross-sectional area of the hollow chambers 8 and 9 of the extruded profile 2. The straightening of the webs 12 and 13 in the motor vehicle structural component, in comparison with the webs 12 and 13 of the extruded profile 2 bent towards the outer walls 10 and 11, is also now clearly evident.

The illustrations in the figures make it furthermore clear that by means of an existing machine for production of extruded profiles 2, motor vehicle structural components 1 can now be made available with dimensions which could not really be achieved on the machine for production of extruded profiles. To this extent, a small machine for production of extruded profiles 2 may be used together with a subsequent forming step in order to produce larger dimensioned motor vehicle structural components.

FIG. 3 shows a cross-sectional illustration of an exemplary embodiment of an extruded profile 2 with two precursor hollow chambers 8, between which a further precursor hollow chamber 9 is arranged. This extruded profile 2 serves as a precursor profile for production of a motor vehicle component 1 in the form of a crash box or a longitudinal member. The precursor hollow chambers 8 are here separated from the precursor hollow chamber 9 by inner walls 7. The inner walls 7 are attached to the inside of outer walls 3 and 4 at connecting points 5 and 6. Both the outer wall 3 and the outer wall 4, which are arranged in their transverse extent between the outer walls 10 and 11, have regions 16 with a non-linear course in the region of their hollow chambers 8 in their transverse extent between the outer walls 10 and 11.

After provision of the extruded profile 2 according to FIG. 3, this extruded profile 2 is laid in a split pressing tool (not shown here), wherein inner mandrels (not shown in the figures) are introduced into the precursor hollow chambers 8 and 9 of the extruded profile 2.

After laying the extruded profile 2 in the split pressing tool (not shown in figures), the curved non-linear regions 16 of the outer wall 3 are straightened in the region of the precursor hollow chambers 8, so that the outer walls 3 and 4 are now configured so as to be linear and not curved over the entire transverse extent, and also run parallel to one another. During this straightening of the outer walls 3 and 4, the inner mandrels are expanded, or a transverse movement of two mandrels (not shown here) takes place, wherein the outer walls 10 and 11 of the precursor hollow chambers 8 and 9 are not substantially formed. After straightening of the outer walls 3 and 4, the extruded profile 2 from FIG. 3 has now developed into the finished crash box as the structural component 1 from FIG. 4. The cross-sectional area of the hollow chambers 14 of the motor vehicle component 1 has been enlarged in comparison with the cross-sectional area of the hollow chambers 8 of the extruded profile 2, while the hollow chamber 15 of the motor vehicle component 1 remains unchanged in relation to the cross-sectional area of the hollow chambers 8 of the extruded profile 2.

During forming of the extruded profile 2 from FIG. 3 in the split pressing tool, only the outer walls 3 and 4 are straightened. Both the outer walls 10 and 11 and also the inner walls 7 separating the precursor hollow chambers 8 from the precursor hollow chamber 9 remain unchanged during the entire forming process. As evident from a comparison of FIGS. 3 and 4, during forming of the extruded profile 2 into the bumper as a motor vehicle structural component 1, the width of the precursor hollow chambers has increased. It is therefore found that the widths of the hollow chambers 14 of the motor vehicle structural component 1, which developed from the precursor hollow chambers 8 of the extruded profile 1, have increased in comparison with the width of the precursor hollow chambers 8 of the extruded profile 2. Furthermore, it is evident in FIGS. 3 and 4 that the precursor hollow chamber 9 of the extruded profile 2 has transformed unchanged into the hollow chamber 15 of the motor vehicle structural component 1. The same applies to the height of the hollow chambers 14 and 15 of the motor vehicle structural component 1, which has remained unchanged during forming in comparison with the height of the precursor hollow chambers 8 and 9 of the extruded profile 2. Optionally, it is possible that the crash box extruded profile is calibrated in the split pressing tool by the expansion itself or after expansion of the precursor hollow chambers 8, such that the pressing tool halves (not shown) introduce compressive stresses into the outer walls, in particular in the region 16, by compression.

The illustration in the figures makes it furthermore clear that by means of an existing machine for production of extruded profiles, now motor vehicle structural components 1 can be made available in the form of a crash box with dimensions which cannot really be achieved on such a machine for producing extruded profiles. To this extent, a small machine for producing extruded profiles with a subsequent forming step may be used to produce larger dimensioned motor vehicle structural components. For forming, existing pressing tools may be used in which only the forming tools must be adapted accordingly.

Furthermore, FIG. 5 now shows a cross-sectional illustration of a further exemplary embodiment of an extruded profile 2 with four precursor hollow chambers 8 and 9, before forming into a bulkhead profile 1 shown in FIG. 6. These precursor hollow chambers 8 and 9 are separated from one another by inner walls 7. The inner walls 7 are here connected to the inside of outer walls 3 and 4 at connecting points 5 and 6. Both the outer wall 3 and the outer wall 4 are formed curved in the region 16 of the precursor hollow chamber 8 between the inner wall 7, separating the precursor hollow chamber 8 from a precursor hollow chamber 9, and a web 12 and thus have a non-linear course there. On one of the precursor hollow chambers 9 lying opposite the precursor hollow chambers 8, a web 13 is arranged, as in the precursor hollow chamber 8, in the region at which the outer walls 3 and 4 meet one another. The two webs 12 and 13 are here also formed curved, and therefore also have a non-linear course. The webs 12 and 13, similarly to the exemplary embodiment of FIG. 1, are here curved towards the hollow chambers 8 and 9. This curved design of the webs 12 and 13 is again due to the circumstance that such an extruded profile can be produced on a machine for extruding hollow chamber profiles or multichamber profiles, the maximum production dimension of which corresponds to the distances between the curved webs 12 and 13.

After provision of the extruded profile 2 according to FIG. 5, this extruded profile is laid in a split pressing tool (not shown here), wherein the precursor hollow chambers 8 and 9 of the extruded profile 2 are filled with inner mandrels (not shown in the figures).

After insertion of the extruded profile 2 in the split pressing tool (not shown in figures), the curved non-linear regions 16 of the outer walls 3 and 4 are partially straightened over their transverse extent, in particular in the regions 16 with non-linear course, so that the height of the precursor hollow chamber 8 is reduced while its width is increased.

Here initially, the outer walls 16 are compressed in a compression direction by means of the pressing tool closing movement, wherein the height of the precursor hollow chamber 8 is reduced. Then the outer walls 16 are expanded in an expansion direction by means of an expanding inner tool or transversely moved mandrel, wherein the expansion direction stands at an angle of around 90° to the compression direction, i.e. the press closing direction.

At the same time as compression, the webs 12 and 13 arranged on the outer walls 3 and 4 may be straightened. After such forming of the extruded profile 2 of FIG. 5, the finished motor vehicle structural component 1 is achieved in the form of a bulkhead profile according to FIG. 6. As evident from FIG. 6, the web 12, which is arranged at the hollow chamber 14 of the motor vehicle structural component 1 resulting from the precursor hollow chamber 8, is now extended, wherein this is now no longer curved towards the hollow chamber 14. Rather, the web 12 now has a straight linear course.

In contrast to the precursor hollow chamber 8 of the extruded profile 2, the precursor hollow chambers 9 of the extruded profile 2 remain unchanged during forming and transform into hollow chambers 15 of the motor vehicle structural component 1. Only the web 13 arranged on the outer hollow chamber 15 of the motor vehicle structural component 1 is also straightened during forming, so that it now also has a straight linear course, corresponding to the web 12 on the hollow chamber 14 of the motor vehicle structural component 1.

FIG. 7 shows a top view of an extruded profile 2 which is formed as a two-chamber hollow profile. As evident from this illustration, this extruded profile 2 is configured differently at its ends in contrast to its middle region. A cross-sectional illustration of this middle region is shown in FIG. 10, which depicts the cross-section of the extruded profile 2 from FIG. 7 along the section plane A-A. This cross-section remains unchanged during forming of the extruded profile 2 into a bumper. This means that the precursor hollow chambers 8 and 9 in the middle region of the extruded profile 2, during forming into a bumper, transform unchanged into the hollow chambers 14 and 15 of the motor vehicle structural component 1 as the bumper. In contrast, the two end regions of the extruded profile 2 change in cross-section during forming into the bumper.

The cross-section of the end regions of the extruded profile 2 is shown in FIG. 8. This corresponds to the section along plane B-B of FIG. 7. The extruded profile 2 is here laid in an opened two-part pressing tool 20, 21, and the forming tools 22 and 23 necessary for forming the extruded profile 2 into a bumper are already positioned in the precursor hollow chambers 8 and 9. The forming tool 23 in the precursor hollow chamber 9 is configured as a solid mandrel, while the forming tool 22 in the precursor hollow chamber 8 is configured as an expandable or transversely movable mandrel. To close the pressing tool, its two parts 20 and 21 are moved towards one another in the arrow directions 24 and 25 shown in FIG. 8. During this, the height of the precursor hollow chamber 8 is reduced.

Then, or at the same time as closing the pressing tool 20, 21, a transverse movement of the forming tool 22 placed in the precursor hollow chamber 8 takes place in the direction of the arrows 26, 27. Firstly, this increases the width of the precursor hollow chamber 8, and secondly straightens a region 16 of an outer wall of the precursor hollow chamber 8 with non-linear course, so that the end regions of the bumper to be produced from the extruded profile 2 are produced. The extruded profile 2 now formed into the bumper can be removed from the pressing tool 20, 21 after opening.

LIST OF REFERENCE SIGNS

1 Motor vehicle structural component
2 Extruded profile
3 Outer wall
4 Outer wall
5 Connection point
6 Connection point
7 Inner wall
8 Precursor hollow chamber
9 Precursor hollow chamber
10 Outer wall
11 Outer wall
12 Web
13 Web
14 Hollow chamber
15 Hollow chamber
16 Region
20 Pressing tool
21 Pressing tool
22 Forming tool
23 Forming tool
24 Arrow
25 Arrow
26 Arrow
27 Arrow

The invention claimed is:

1. A method for manufacturing a motor vehicle structural component from an extruded multichamber hollow profile, with the following steps:
   a) provision of an extruded profile with at least two precursor hollow chambers which are separated from one another by an inner wall, wherein at least one outer wall of at least one precursor hollow chamber, in cross-section perpendicularly to a longitudinal extent of the extruded profile, has a region with non-linear course,
   b) forming of the extruded profile over an entire longitudinal extent of the extruded profile into the motor vehicle structural component, wherein at least the region with non-linear course of the at least one outer wall of the at least one precursor hollow chamber, with non-linear course in cross-section, is at least partially straightened, with a change in cross-section of the respective precursor hollow chamber into the cross-section of the corresponding hollow chamber of the motor vehicle structural component, and wherein the inner wall remains unchanged during the forming of the extruded profile, wherein at least on an outer wall of at least one precursor hollow chamber, a non-linear web is arranged which is at least partially straightened in step b).

2. The method as claimed in claim 1, wherein the forming in step b) takes place in a cavity of a split pressing tool, wherein in one precursor hollow chamber of the extruded profile, the cross-section remains substantially unchanged, and a forming tool or mandrel is inserted, an outer contour of which corresponds to an inner contour of the hollow chamber of the motor vehicle structural component, while in the precursor hollow chamber of the extruded profile of which the cross-section is changed, an expanding forming tool or transversely movable mandrel is inserted which expands or is moved transversely during and/or after closing of the split pressing tool until a definitive form of the hollow chamber of the motor vehicle structural component is achieved.

3. The method as claimed in claim 2, wherein both a compression and an expansion are carried out inside the split pressing tool in a same pressing stroke.

4. The method as claimed in claim 1, wherein during the forming in step b), a thickness of at least one outer wall of the hollow chamber with cross-section to be changed is reduced, and a thickness of at least one other outer wall of the hollow chamber with cross-section to be changed remains substantially unchanged.

5. The method as claimed in claim 1, wherein the forming according to step b) takes place such that a circumscribing circle of the extruded profile has a smaller diameter than a circumscribing circle of the motor vehicle structural component.

6. The method as claimed in claim 1, wherein the at least one precursor hollow chamber is formed in multiple phases such that firstly a compression takes place of at least one outer wall in a compression direction, and during this a width or a height of the precursor hollow chamber is reduced, and then an expansion takes place of this at least one outer wall in an expansion direction, wherein the expansion direction stands at an angle between 30° and 150° to the compression direction.

7. The method as claimed claim 1, wherein the at least one precursor hollow chamber is formed in multiple phases such that firstly an expansion of at least one outer wall takes place in an expansion direction, wherein the expansion direction stands at an angle between 30° and 150° to a compression direction, and then a compression of this at least one outer wall takes place in the compression direction and during this a width or a height of the precursor hollow chamber is reduced.

8. The method as claimed in claim 1, wherein at least one of the hollow chambers of the motor vehicle structural component has a smaller width than the corresponding precursor hollow chamber of the extruded profile.

9. The method as claimed in claim 1, wherein at least one of the hollow chambers of the motor vehicle structural component has a greater width than the corresponding precursor hollow chamber of the extruded profile.

10. The method as claimed in claim 1, wherein at least one of the hollow chambers of the motor vehicle structural component has a smaller height than the corresponding precursor hollow chamber of the extruded profile.

11. The method as claimed in claim 1, wherein at least one of the hollow chambers of the motor vehicle structural component has a greater height than the corresponding precursor hollow chamber of the extruded profile.

12. The method as claimed in claim 1, wherein the at least one precursor hollow chamber of the extruded profile in cross-section is formed round, oval or arcuate in at least a partial periphery, and is formed into a polygonal hollow chamber of the motor vehicle structural component.

\* \* \* \* \*